United States Patent [19]

Erb et al.

[11] 3,989,850
[45] Nov. 2, 1976

[54] DECAFFEINATION PROCESS

[75] Inventors: William W. Erb, South Salem; William J. Einstman, Port Chester, both of N.Y.; Gary V. Jones, Ramsey, N.J.; George A. McGregor, Amawalk, N.Y.

[73] Assignee: General Foods Corporation, White Plains, N.Y.

[22] Filed: Dec. 13, 1974

[21] Appl. No.: 532,545

[52] U.S. Cl. .............................. 426/242; 426/427; 426/465
[51] Int. Cl.$^2$ ............................................ A23F 1/10
[58] Field of Search ........... 426/427, 428, 460, 459, 426/465, 481, 472, 432, 385, 242

[56] References Cited
UNITED STATES PATENTS

| | | | |
|---|---|---|---|
| 1,977,416 | 10/1934 | Wilder | 426/428 |
| 2,309,092 | 1/1943 | Berry et al. | 426/428 X |
| 3,063,848 | 11/1962 | Van Gelder | 426/242 |
| 3,445,247 | 5/1969 | Baerwald | 426/385 X |
| 3,669,679 | 6/1972 | Panzer et al. | 426/428 |
| 3,700,464 | 10/1972 | Patel et al. | 426/428 |
| 3,700,465 | 10/1972 | Lawrence et al. | 426/428 |

FOREIGN PATENTS OR APPLICATIONS 854,703  11/1960  United Kingdom ............... 426/428

OTHER PUBLICATIONS

"Chemical Engineers' Handbook," John H. Perry, Editor, 3rd Edition, published by McGraw Hill Book Co., 1950, pp. 997–998.

*Primary Examiner*—Frank W. Lutter
*Assistant Examiner*—N. Greenblum
*Attorney, Agent, or Firm*—Richard Kornutik

[57] ABSTRACT

Decaffeinated coffee of improved quality is achieved using a process wherein caffeine-containing green coffee is countercurrently extracted with a water solution of coffee solubles. The decaffeinated coffee removed from the extraction zone is treated to remove surface solids contained thereon and is then dried at temperatures not in excess of 200° F. The critical combination of a specified lower limit of surface solids on the coffee prior to drying and the drying temperature has been found to result in a decaffeinated coffee product of improved flavor.

12 Claims, No Drawings

DECAFFEINATION PROCESS

BACKGROUND OF THE INVENTION

This invention relates to coffee and more particularly to decaffeinated coffee.

The major concern of decaffeinated coffee producers has long been the desire to achieve rapid efficient removal of caffein from green coffee without deleteriously affecting the eventual coffee product produced from the decaffeinated coffee. Thus for example, while extremely high temperatures will generally increase decaffeination rates it is at the expense of damaging the flavor and aroma components of the green coffee resulting in a final coffee product which does not closely resemble its undecaffeinated counterpart.

Decaffeination processes employing an organic solvent for caffeine have the advantage of achieving caffeine removal in a relatively short time; however, direct contact of green coffee with solvent may be undesirable due to the possibility of amounts of solvent remaining in the coffee and thereby adversely altering the flavor of resultant coffee product. Further, caffeine-solvents are also found to remove amounts of desirable waxes and oils from the green coffee which themselves contribute to the overall flavor and aroma of the coffee.

U.S. Pat. No. 2,309,092 to Berry, et al. issued Jan. 26, 1943 describes a notable advance in the decaffeination art. According to this process, the extraction medium for caffeine is a water solution of green coffee water solubles, other than caffeine, at a concentration in equilibrium with the water soluble solids in the green coffee. This aqueous extract is continuously recycled through the green coffee and through a liquid-liquid extraction with a water-immiscible, organic caffeine solvent. This method produces decaffeinated coffee of superior flavor and aroma for beverage purposes due to the fact that the organic caffeine solvent does not come in direct contact with the green coffee beans.

Although the water extraction process described in U.S. Pat. No. 2,309,092 was a decided advance in the art, there still exists the need for further improving the quality of decaffeinated coffees such that coffee beverages prepared therefrom more nearly approximate their undecaffeinated counterparts in flavor and aroma.

It is accordingly an object of this invention to prepare decaffeinated coffees of improved quality.

It is another object of this invention to prepare decaffeinated coffees of improved quality by improvement on the water extraction process described in U.S. Pat. No. 2,309,092.

SUMMARY OF THE INVENTION

It has been found that the objects of this invention can be achieved by improving the treatment of the decaffeinated green coffee produced by the water extraction process after the green coffee has been discharged from the extraction zone. More specifically, the present invention involves removing surface solids from the green coffee withdrawn from the extraction zone such that less than about 0.3% surface solids by dry weight remain on the decaffeinated green coffee and then drying the so treated coffee at temperatures not in excess of 200° F.

According to the process of this invention caffeine-containing green coffee is decaffeinated using a water solution of green coffee water solubles other than caffeine according to the process described in U.S. Pat. No. 2,309,092. Hence, it is essential in order to understand the environment of this invention to refer to the above-mentioned patent wherein the extraction of caffeine from green coffee is described and which further describes the subsequent treatment of the extraction medium to remove caffeine therefrom. This essential material contained in the aforementioned patent is, in fact, necessary for adequately describing the present invention and is accordingly expressly incorporated herein by reference. The improved quality product of this invention is achieved by processing improvements performed on the decaffeinated coffee withdrawn from the extraction zones after having been finally contacted with the water extraction medium as described in Berry, et al.

DETAILED DESCRIPTION OF THE INVENTION

According to this invention, the decaffeinated coffee withdrawn from the caffeine-extraction zone is treated to remove surface solids remaining thereon and then dried at temperatures not in excess of 200° F. It has been found that this combination of operating steps is critical in order to achieve an improved quality decaffeinated coffee. Thus, merely removing surface solids yet drying at temperatures above 200° F does not result in any significant quality improvement. Conversely, drying temperatures below 200° F do not result in any significant quality improvement if the surface solids on the coffee before drying are not lowered below the aforementioned level.

The decaffeinated coffee withdrawn from the extraction zone contains solids adhering thereto as a result of contact with the water solution of coffee solubles during extraction. Following the overall Berry et al. process wherein the decaffeinated coffee is washed with an amount of water substantially equal to the volume of the extracting liquid absorbed by the coffee it has been found that surface solids do in fact remain on the coffee generally in the order of about 1.1% to 1.8% by dry weight of the coffee.

We have found that in order to obtain a decaffeinated coffee of improved quality it is necessary to remove surface solids such that the decaffeinated coffee contains less than about 0.3% surface solids by dry weight prior to being dried. In the most preferred practice of this invention, substantially all the surface solids are removed from the decaffeinated green coffee. In practice, this embodiment requires beans with less than about 0.1% surface solids by dry weight remaining thereon prior to drying.

A variety of methods may be employed to remove the requisite surface solids from the decaffeinated green coffee withdrawn from the extraction zone. Thus, wash water can be directed on the coffee in an amount and for a time sufficient to result in decaffeinated green coffee having surface solids below the above-mentioned level. The green coffee is then separated from the resultant water solution, for example, by decantation or washing the coffee on a screen. However, since the surface solids removed from the green coffee are generally recycled to the feed supply of the water extract to the extraction zone it has been found that due to the amount of water needed to remove the requisite solids, the surface solids solution added back to the feed supply of water extract may result in too substantial a dilution of the feed supply hence altering the substantial dynamic equilibrium between water extract solids and green coffee solids desired during extraction.

Accordingly, our most preferred means for achieving the requisite surface solids removal from the decaffeinated green coffee is by subjecting the coffee to the action of centrifugal force. Typically, a basket-type centrifuge is employed wherein the decaffeinated coffee withdrawn from the extraction zone is loaded into the centrifuge and during centrifugation the solids solution is forced through the basket apertures and directed into a suitable collection vessel from which the solution is pumped to the feed supply of water extract.

The coffee may be transferred directly from the extraction zone into the centrifuge apparatus and subjected to centrifugal force sufficient to remove the requisite amount of surface solids. Alternatively, the coffee may first be water washed with an amount of water insufficient to result in substantial dilution of the feed supply of green extract when the aqueous effluent from the washing step is added thereto and then centrifuged to remove the additional surface solids needed to result in coffee having less than 0.3% surface solids by dry weight prior to drying.

Generally it is not necessary to add any aqueous wash solution when centrifuging is employed making this means of solids removal particularly attractive since the aqueous effluent from the centrifuge will not cause extensive dilution when added to the feed supply of water extract to the extraction zone. However, it may be desirable to add minor amounts of water during centrifugation to facilitate solids removal. A particularly preferred embodiment involves first centrifuging without adding water and then centrifuging again with minor amounts of added water. In any event the effluent from the centrifuge is not so dilute so as to significantly adversely alter the concentration of the feed water extract supply.

Whenever wash water is employed to achieve surface solids removal it is preferred that the water be relatively cold, that is, less than about 100° F and preferably below 60° F so as to avoid the actual extraction of water soluble constituents from within the decaffeinated green coffee. It is also found that even treatment with cold water if for a long enough period of time may also result in the extraction of soluble green coffee constituents. The washing time and water temperature can be easily optimized and counterbalanced to achieve only the removal of surface solids without any substantial extraction occurring. When centrifugation is employed it is rare that amounts of water or time of contact will be substantial enough to cause extraction making centrifuging an especially preferred method.

When employing centrifugation to remove the requisite surface solids from the decaffeinated coffee prior to drying it is preferred to operate at a centrifugal force in excess of about 180 G's and most preferably above about 500 G's. Under these conditions surface solids are efficiently removed from the decaffeinated coffee at a relatively rapid rate. While no criticality exists as to an upper limit it is generally unneccessary to exceed about 600–700 G's.

As previously stated, it is preferred to remove substantially all of the surface solids from the decaffeinated coffee prior to drying since we have found the quality improvement to be at its greatest when this condition is met. By substantially all is generally meant less than about 0.1% surface solids by dry weight remaining on the coffee. This condition is easily observed merely by washing the beans until a clear effluent appears. Similarly, where centrifuging is employed with wash water added, the appearance of a clear effluent generally indicates the achievement of substantially complete removal. Where centrifuging is employed with no water added it is possible to visually observe the condition of complete solids removal.

Where it is not desired to remove substantially all of the surface solids, and irrespective of the particular means employed for removing surface solids from the decaffeinated green coffee prior to drying we have found that the measurement of the surface solids remaining on the coffee is best achieved using a centrifuge apparatus.

As an example of the use of this method, a sample portion of beans removed from the extraction zone are placed in a basket centrifuge and spun and washed until a clear effluent appears (indicating the removal of substantially all the surface solids). The concentration of the total effluent is measured and knowledge of the amount of effluent collected allows a calculation of the weight of surface solids removed which in turn is the weight of total surface solids on the beans removed from the extraction zone.

When a batch of beans removed from the extraction zone is treated to remove surface solids, the solids removed are measured and then substracted from the total surface solids content, as calculated above, yielding the weight of surface solids remaining on the decaffeinated beans which can then be expressed as a percentage by dry weight.

As earlier mentioned, the provision of decaffeinated green coffee having less than about 0.3% surface solids by dry weight and preferably less than 0.1% prior to drying is not itself alone sufficient to achieve a significant quality improvement in the decaffeinated coffee. It is critical to this invention to dry the so treated coffee at drying temperatures not in excess of about 200° F. Coffee having below the critical level of surface solids yet dried at temperatures above about 200° F does not display the degree of quality improvement obtained by this invention.

Numerous drying techniques may be employed according to this invention so long as the temperatures involved do not exceed about 200° F. It is preferred that the temperature be less than about 180° F. Thus, for example, freeze-drying may be employed or microwave drying as disclosed in commonly-assigned U.S. Ser. No. 344,395. One preferred drying means are air dryers typically such as fixed-bed dryers wherein hot air is passed through a fixed bed of coffee, belt dryers wherein a moving bed of coffee is continuously passed through an air drying chamber, agitated dryers wherein coffee is continuously tumbled in a hot air-containing vessel e.g., a roaster, and fluidized bed dryers wherein coffee is contacted with an upward stream of air such that the coffee is agitated and constant particle to particle contact is minimized allowing for more efficient drying of each individual particle. Any such method may be employed so long as the drying temperature does not exceed 200° F, however, our most preferred method employs a fluidized bed dryer utilizing an air inlet temperature of about 150° F.

The following examples are provided to illustrate specific embodiments of this invention.

EXAMPLE I

Decaffeinated coffee beans withdrawn from the extraction zone according to the process described in U.S. Pat. No. 2,309,092 and washed with water according to the above patent were collected and separated into three 3¾ pound samples. Samples III was given additional treatment by placing it in a basket centrifuge for 30 seconds rotating at about 600 G's, and then rotated for an additional 30 seconds with the addition of a light spray of water at 58° F. A clear effluent appeared and 1.8% surface solids by dry weight were found to have been removed. Sample I was given no additional treatment (thus having 1.8% surface solids thereon) and Sample II was treated via centrifuging such that 0.55% surface solids by dry weight remained thereon.

All three samples were dried in a fluidized bed dryer utilizing an air temperature of about 151° F. Coffee brews were prepared by separately roasting and grinding the three samples and percolating them. An expert flavor panel preferred Sample III in that it was cleaner and stronger than either Sample I or Sample II. Sample II displayed no significant improvement over Sample I.

EXAMPLE II

Decaffeinated green coffee recovered after washing according to the Berry, et al. process were divided into four samples. Sample I was given no additional treatment and contained approximately 1.5% surface solids by dry weight. Samples II through IV were centrifuged with the addition of water at about 600 G's until substantially all the surface solids were removed (less than about 0.1% by dry weight).

Sample I was dried using a Roto-Louvre Dryer having an inlet air temperature of 350° F. This type dryer is a rotating vessel described in Chemical Engineers Handbook, 20 – 29, 4th ed. (McGraw-Hill 1963). Samples II through IV were dried in a fluidized bed dryer at air temperatures of 150° F, 180° F and 220° F. All samples were then brewed under identical conditions.

An expert taste panel found Sample I to be thin and underdeveloped with low aromatics and similar characteristics for Sample IV. Samples II and III were preferred by the tasters in that the brews were cleaner, smoother, more full-bodied and higher in aromatics.

While the above examples illustrate specific preferred embodiments of the invention they are not intended to thereby limit the present invention. Various other modifications and operating parameters are believed ascertainable by those skilled-in-the-art without departing from the scope and spirit of the invention as defined by the appended claims.

We claim:

1. In a decaffeination process wherein caffeine-containing green coffee is added to one end of an extraction zone, and withdrawn from the other end of the extraction zone while a water solution of coffee solubles is flowed through said zone counter-current to said coffee, the improvement comprising removing surface solids from said withdrawn coffee such that less than about 0.3% by dry weight remain thereon, and subsequently drying said coffee at air temperatures not in excess of 200° F.

2. The process of claim 1 wherein said drying is performed in an air fluidized-bed dryer.

3. The process of claim 2 wherein said drying temperature is less than about 180° F.

4. The process of claim 1 wherein said drying is performed by freeze-drying.

5. The process of claim 1 wherein said drying is performed by subjecting the coffee to the action of microwave energy.

6. The process of claim 1 wherein said surface solids are removed by subjecting said coffee to the action of centrifugal force.

7. The process of claim 6 wherein said centrifugal force is at least 185 G's.

8. The process of claim 7 wherein water is added to said coffee during centrifugation.

9. The process of claim 8 wherein said drying is performed in an air fluidized-bed dryer.

10. The process of claim 9 wherein less than 0.1% surface solids by dry weight remains on said coffee before drying.

11. The process of claim 10 wherein said drying temperature is less than about 180° F.

12. The process of claim 1 wherein said surface solids are removed by contacting said coffee with water and separating said coffee from the resultant water solution of solids.

* * * * *